United States Patent
Spesser et al.

(10) Patent No.: US 9,802,499 B2
(45) Date of Patent: Oct. 31, 2017

(54) HIGH-VOLTAGE CHARGING DEVICE

(71) Applicant: Dr. Ing. h.c. F. Porsche Aktiengesellschaft, Stuttgart (DE)

(72) Inventors: Daniel Spesser, Illingen (DE); Lutz Elsholz, Berlin (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 192 days.

(21) Appl. No.: 14/854,124

(22) Filed: Sep. 15, 2015

(65) Prior Publication Data
US 2016/0079025 A1 Mar. 17, 2016

(30) Foreign Application Priority Data
Sep. 16, 2014 (DE) .................. 10 2014 218 521

(51) Int. Cl.
| | |
|---|---|
| *H02J 7/00* | (2006.01) |
| *B60L 11/18* | (2006.01) |
| *H01H 85/02* | (2006.01) |
| *H01H 85/20* | (2006.01) |
| *H01H 85/25* | (2006.01) |
| *H01H 3/02* | (2006.01) |

(52) U.S. Cl.
CPC ...... *B60L 11/1824* (2013.01); *H01H 85/0241* (2013.01); *H01H 85/2045* (2013.01); *H02J 7/0042* (2013.01); *H01H 85/25* (2013.01); *H01H 2003/0286* (2013.01)

(58) Field of Classification Search
CPC ............... H02J 7/0042; B60L 11/1824; H01H 2003/0286; H01H 85/2045; H01H 85/25; H01H 85/0241; H01H 2231/00; H01H 2085/0275

USPC .......................................................... 320/109
See application file for complete search history.

(56) References Cited

U.S. PATENT DOCUMENTS

| | | | |
|---|---|---|---|
| 5,222,131 A * | 6/1993 | Heidorn ............. | H01H 85/2045 361/835 |
| 2013/0187601 A1* | 7/2013 | Petrie ................... | H01R 13/635 320/109 |
| 2013/0327567 A1* | 12/2013 | Matsumoto .......... | H01H 85/175 174/520 |

FOREIGN PATENT DOCUMENTS

| | | |
|---|---|---|
| JP | H6265919 A | 9/1994 |
| JP | H10277236 A | 10/1998 |
| JP | 2004662 A | 1/2004 |
| JP | 2004048960 A | 2/2004 |
| JP | 2006061609 A | 3/2006 |

(Continued)

*Primary Examiner* — Nathaniel Pelton
(74) *Attorney, Agent, or Firm* — Gerald E. Hespos; Michael J. Porco; Matthew T. Hespos

(57) ABSTRACT

A charging device for electric vehicles or plug-in hybrids has a housing. At least one printed circuit board with fuses thereon is arranged on the printed circuit board. The printed circuit board, together with the fuses, is arranged in the interior of the housing and is connected to the housing in a force-fitting and/or interlocking manner by at least one fastening element (2). A covering element (1) covers the printed circuit board and the fastening element (2) at least in sections, and insertion or removal of the fuses onto or from the printed circuit board can be carried out only by removing the printed circuit board from the interior of the housing. The covering element (1) has to be damaged at least in sections to remove the printed circuit board.

10 Claims, 1 Drawing Sheet

(56) References Cited

FOREIGN PATENT DOCUMENTS

JP  2009153668 A  7/2009
JP  2012161527 A  8/2012

* cited by examiner

HIGH-VOLTAGE CHARGING DEVICE

CROSS REFERENCE TO RELATED APPLICATION

This application claims priority under 35 USC 119 to German Patent Appl. No. 10 2014 218 521.1 filed on Sep. 16, 2014, the entire disclosure of which is incorporated herein by reference.

BACKGROUND

1. Field of the Invention

The invention relates to a charging device for electric vehicles or plug-in hybrids and also to a service set for replacing at least one fuse in a charging device. The invention further relates to a covering element for a charging device and/or as a replacement part for the service set.

2. Description of the Related Art

Vehicles, such as electric vehicles or plug-in hybrids, can be equipped with an on-board charging device (CD). The on-board charging device performs a charging function and also can be designed as an energy distributor. Additional insertion points must be integrated in the charging device so that the charging device can distribute high voltage. High-voltage components that are supplied with the high voltage by means of the insertion points may be, for example, an electrical air-conditioning compressor or a high-voltage heater. High-voltage fuses must be kept in the charging device to ensure sufficient line safeguarding of the components that are connected to the charging device at the insertion points. The high-voltage fuses are tripped in the event of a possible short circuit. The fuses must be replaced after a short circuit so that the charging device can be used again after the short circuit. Thus, the fuses must be accessible, for example, via a service hatch and must be replaceable. However, direct contact cannot be made with the fuses must be prevented after the service hatch has been shut or screwed closed or since high voltage still could be present across the fuses in a system that is still active. Thus, a further service cover usually is located in front of the fuses and is provided with a warning instruction as a precaution. With this structural design, the service cover can be removed, the fuses can be replaced and then the same service cover can be re-inserted. Since the same service cover can be re-used, it is not possible for a service engineer working on the charging device to identify whether the fuses that are situated behind the service cover have already been manipulated. As a result, in the event of a guarantee claim for example, it is very difficult for either the manufacturer or the customer to prove whether a fault in the charging device or faults in high-voltage components that are connected to the charging device were caused, for example, by incorrect replacement of a fuse by a third-party manipulation.

The present invention therefore is based on the object of providing a charging device that allows manipulation of the fuses to be identified.

SUMMARY

The invention relates to a charging device for vehicles, in particular for electric vehicles or plug-in hybrids. The charging device has a housing with at least one printed circuit board and fuses are arranged on the printed circuit board. The printed circuit board is arranged in the interior of the housing and is connected to the housing in a force-fitting and/or interlocking manner by at least one fastening element. A covering element is connected to the printed circuit board by at least one fastening means and covers the printed circuit board and the fastening element at least in sections. Insertion or removal of the fuses onto or from the printed circuit board can be carried out only by removing the printed circuit board from the interior of the housing. Additionally, the covering element has to be damaged at least in sections to remove the printed circuit board.

The structural design of the covering element is such that the covering element is damaged when the covering element is removed to access the fuses on the printed circuit board. Additionally, removal or mounting of the fuses from or on the printed circuit board can be carried out only by removing the printed circuit board from the interior of the housing. The covering element or service cover is damaged unavoidably before access to the printed circuit board is possible. Therefore, a manipulation or attempted manipulation of the fuses and/or of the printed circuit board can be proven clearly.

The assembly of the components of the charging device may be carried out in a specified manner to function properly as an indicator of manipulation or attempted manipulation of the fuses on the printed circuit board. In particular, the fuses are fastened to the printed circuit board before the printed circuit board is inserted into the interior of the housing of the charging device. The printed circuit board then may be inserted in a force-fitting and/or interlocking manner by fastening means, such as screws, that engage in corresponding mating holding means, such as threaded holes in the housing of the charging device, or that engage into the housing of the charging device in a self-tapping manner. After the fuses have been fastened on the printed circuit board, the printed circuit board can be inserted into the interior of the housing of the charging device, and can be screwed to the housing, as described. The printed circuit board and the fuses fastened thereon are protected by the covering element only after the printed circuit board has been screwed to the housing of the charging device. More particularly, the covering element may be fastened to the printed circuit board in an irreversible manner by fasteners via a corresponding opening in the printed circuit board. Alternatively, the covering element can be fastened to the printed circuit board in a force-fitting, interlocking and/or cohesive manner. For example, one or more clips may be formed on the covering element and can engage into the openings in the printed circuit board to define clip connections. However, the service cover also may be connected to the printed circuit board in a cohesive manner by fastening points that may be designed as adhesive bonding points. The only restriction to the functioning of the charging device and the covering element is that, during servicing or during manipulation of the fuses, the covering element can be detached from the printed circuit board at least in the region of the fasteners by destroying the clip connections or by destroying the fastening points that are designed as adhesive bonding points, when the printed circuit board is detached. If the fasteners or the fastening points are designed as adhesive bonding points the cohesive connection between the covering element and the printed circuit board should be designed so that partial or material damage that is visible from the outside occurs when the covering element is detached from the printed circuit board. To ensure visible damage, the material thickness of the service cover can be selected so that the force that has to be applied to break the cohesive connection between the printed circuit board and the covering element is so great that the covering element is damaged at least in the region of the cohesive connection.

The printed circuit board first has to be removed from the interior of the housing of the charging device to be able to insert or remove the fuses onto/from the printed circuit board during servicing or for manipulation of said fuses on the printed circuit board, as described above. However, to remove the printed circuit board from the interior of the housing, it is first necessary to break the force-fitting and/or interlocking connection between the printed circuit board and the housing, such as a connection produced by a screw or other fastening element. To this end, the covering element has to be damaged or at least partially destroyed in the region of the fastening element or elements to operate the screws or other fastening elements, for example using a screwdriver that passes through the covering element.

The covering element may be designed in the region of the fastening elements so that a screwdriver or other tool can pass through the covering element to operate the fastening elements. Thus, the covering element may be produced from plastic and, for example, the wall thickness in the region above the fastening elements may be reduced, as is known in the case of junction boxes or canopies for fastening lamps.

An access opening can be formed on or in the covering element to provide access to the fastening elements. However, the access opening does not permit any manipulation of the fuses that are situated beneath the covering element. The access opening is closed by a structural element in an undamaged state, but the structural element first must be destroyed or damaged to operate the fastening elements that are situated beneath the access openings. The structural element can be, for example, a grid, and meshes of the grid are selected so as not permit the tool to pass through to operate the fastening elements. The fastening element beneath the access opening can be operated by the tool only by destroying the structural element by using said tool.

The structural element that has been damaged or destroyed by the tool serves as an indicator to signal manipulation or attempted manipulation of the fuses of the charging device. Damage to the structural element is understood to mean damage to the covering element at least in sections.

The invention also relates to a service set for replacing at least one fuse for a charging device. The service set comprises at least one fuse and a covering element. The covering element of the service set replaces a covering element that had been damaged to replace the fuse.

The service set ensures that manipulation of the fuses beneath the covering element are performed only by the relevant experts. Accordingly, the service set is a replacement part set that is made available only to the servicing partners who replace a fuse that has been destroyed by a short circuit in the on-board charging device of the vehicle, and who are responsible for servicing work on the charging device.

The invention also relates to the above-described covering element for a charging device and/or to a replacement part for the above-described service set. The covering element is a service cover that blocks direct access to fuses of the charging device in an undamaged state. Thus, the covering element advantageously serves as an indicator that indicates access to the fuses by damage to the covering element.

To avoid repetition with respect to the advantages of the service set of the invention and the covering element of the invention, reference is made to the description of the advantageous design of the charging device of the invention for vehicles.

Further aspects of an exemplary embodiment of the invention are described in greater detail below with reference to the figures. Features mentioned in the claims and in the description each may define the invention individually or in any desired combination. The figures are only descriptive and are not intended to limit the invention in any way.

DETAILED DESCRIPTION

Figure 2:
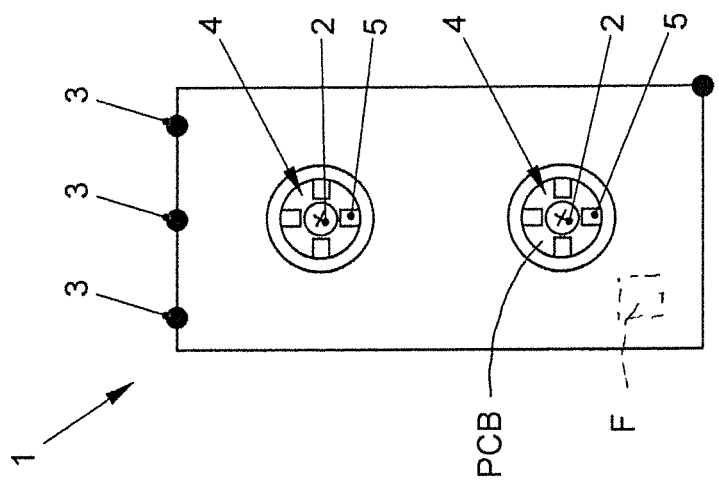
FIG. 2 shows the covering element of FIG. 1 in a damaged state.
Figure 1:
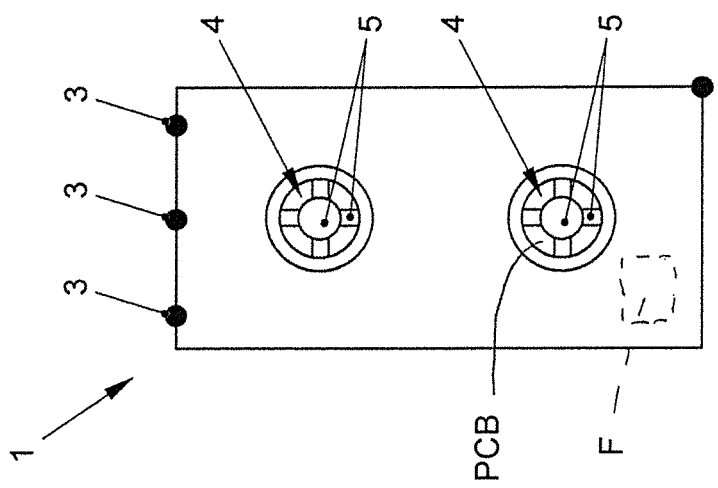
FIG. 1 is a schematic diagram of a covering element for a charging device according to the invention or as a replacement part for the service set according to the invention in an undamaged state.

Identical parts in the figures are provided with the same reference symbols, and therefore are described only once. FIG. 1 schematically shows a covering element 1 according to the invention. The covering element 1 serves as a service cover for a charging device for electric or plug-in hybrid vehicles. The charging device comprises a housing. A printed circuit board PCB is arranged in the interior of the housing and fuses F are arranged on the printed circuit board PCB. The printed circuit board PCB is connected in a force-fitting and/or interlocking manner to the housing of the charging device by fastening elements 2, as illustrated in FIG. 2. The printed circuit board PCB also is connected to the covering element 1 by at least one fastening means 3, as illustrated in FIG. 1. The fastening means 3 may be a force-fitting and/or interlocking connection, for example a clip connection between the covering element 1 and at least one opening in the printed circuit board. However, the fastening means 3 also can be an adhesive bonding point so that the printed circuit board PCB and the covering element 1 are connected to one another in a cohesive manner. The adhesive bonding force between the printed circuit board PCB and the covering element 1 by the fastening means 3 which is an adhesive bonding point that is sufficiently strong so that, when the covering element 1 is detached from the printed circuit board PCB, the covering element 1 will be damaged or completely destroyed at least in the region of the fastening means 3.

Access openings 4 are situated parallel to one another above the fastening elements 2 in the covering element 1. Each access opening 4 is covered by structural elements 5. As illustrated in FIG. 1, the structural elements 5 can be in the form of a cross with a central push-in element. The undamaged structural elements 5 are situated above or in the access openings 4. Additionally, the access openings 4 and the structural elements 5 are arranged above the fastening elements 2. Each structural element 5 comprises four radially aligned struts that hold a central element. The central element can be detached from the struts using a screwdriver to push the central element or using the screwdriver as a lever to engage under the central element. Servicing personnel can assume that no manipulation of the fuses of the printed circuit board PCB has taken place without permission if, during servicing, the covering element 1 is found in the undamaged state. The printed circuit board PCB must be removed from the housing interior if servicing personnel wish to replace fuses F on the printed circuit board. Thus, it is necessary to damage or destroy the structural elements 5 in an irreversible manner to reach the fastening elements 2 that are beneath the structural elements 5 and that connect the printed circuit board to the housing of the charging device in a force-fitting and/or interlocking manner. The structural elements 5 are connected permanently to the covering element 1, or are integral or unitary with the covering element 1. Accordingly, the structural elements 5 of the covering element 1 must be destroyed or damaged irreversibly at least in sections to obtain access to the fastening elements 2 via the access opening 4.

FIG. 2 shows a damaged covering element 1 with the structural elements 5 that have been destroyed irreversibly by pushing the central element in or levering the central member out. The fastening elements 2 in this case are Phillips head screws that are visible beneath the damaged or destroyed structural elements 5. Therefore, the fastening elements 2 can be accessed by a tool, such as a Phillips head screwdriver, through the opened access openings 4 so that the Phillips head screws can be rotated to uncouple the printed circuit board PCB from the housing of the charging device. The printed circuit board and the covering element 1 can be withdrawn from the interior of the housing of the charging device after the screws have been removed. Fuses F could be replaced on the printed circuit board that has been removed from the charging device. However, the damaged structural elements 5 then indicate that replacement of the fuses F or an attempted manipulation of the fuses F has occurred. In this respect, the covering element 1 is secured doubly by the fastening means 3 and the structural elements 5 that close the access opening 4. Thus, a manipulation attempt on the fuses F can be assumed by the detected damage to structural elements 5, irrespective of whether the covering element 1 actually has been detached from the printed circuit board PCB. The fastening means 3 also can connect the covering element 1 to the inner wall of the housing of the charging device. This design requires destruction of the structural elements 5 to detach the printed circuit board from the housing of the charging device, so that the fastening elements 2 beneath the structural elements and at a distance from the covering element 1 can be operated. The fastening means 3 that connect the covering element 1 to the housing of the charging device also would have to be removed, destroyed or damaged, with the covering element 1 then being destroyed in an irreversible manner at least in the region of the fastening means 3.

LIST OF REFERENCE SYMBOLS

1 Covering element
2 Fastening element
3 Fastening means
4 Access opening
5 Structural element

What is claimed is:

1. A charging device for vehicles, comprising: a housing; at least one printed circuit board with fuses arranged thereon being arranged in the housing and being connected to the housing in a force-fitting and/or interlocking manner by at least one fastening element; a covering element secured to the printed circuit board by at least one fastening means and covering the printed circuit board and the fastening element at least in sections so that insertion or removal of the fuses onto or from the printed circuit board can be carried out only by removing the printed circuit board from the interior of the housing, wherein the covering element has to be damaged at least in sections to remove the printed circuit board.

2. The charging device of claim 1, wherein the covering element has to be damaged at the fastening means.

3. The charging device of claim 1, wherein the covering element has to be damaged in a region covering the fastening elements.

4. The charging device of claim 1, wherein the covering element is configured so that removal of the covering element causes sufficient damage to prevent re-use of the covering element.

5. The charging device of claim 1, wherein the covering element has an access opening in a region covering the fastening element, the access opening being closed by a structural element that can be damaged.

6. The charging device of claim 5, wherein the access opening can be opened by damaging the structural element.

7. The charging device of claim 6, wherein the fastening element can be operated through the open access opening to break the force-fitting and/or interlocking connection between the printed circuit board and the housing.

8. A service set for replacing at least one fuse in a charging device of claim 1, comprising: at least one replacement fuse for replacing a damaged fuse of the charging device and a replacement covering element for replacing a covering element that had been damaged in order to replace the damaged fuse.

9. A covering element for a charging device of claim 1 that has a fuse, the covering element having at least one breakable region that blocks direct access to fuses of the charging device in an undamaged state and that must be broken to access the fuse.

10. The covering element of claim 9, designed as an indicator to indicate access to the fuses by at least partial damage to the covering element.

* * * * *